No. 790,759. Patented May 23, 1905.

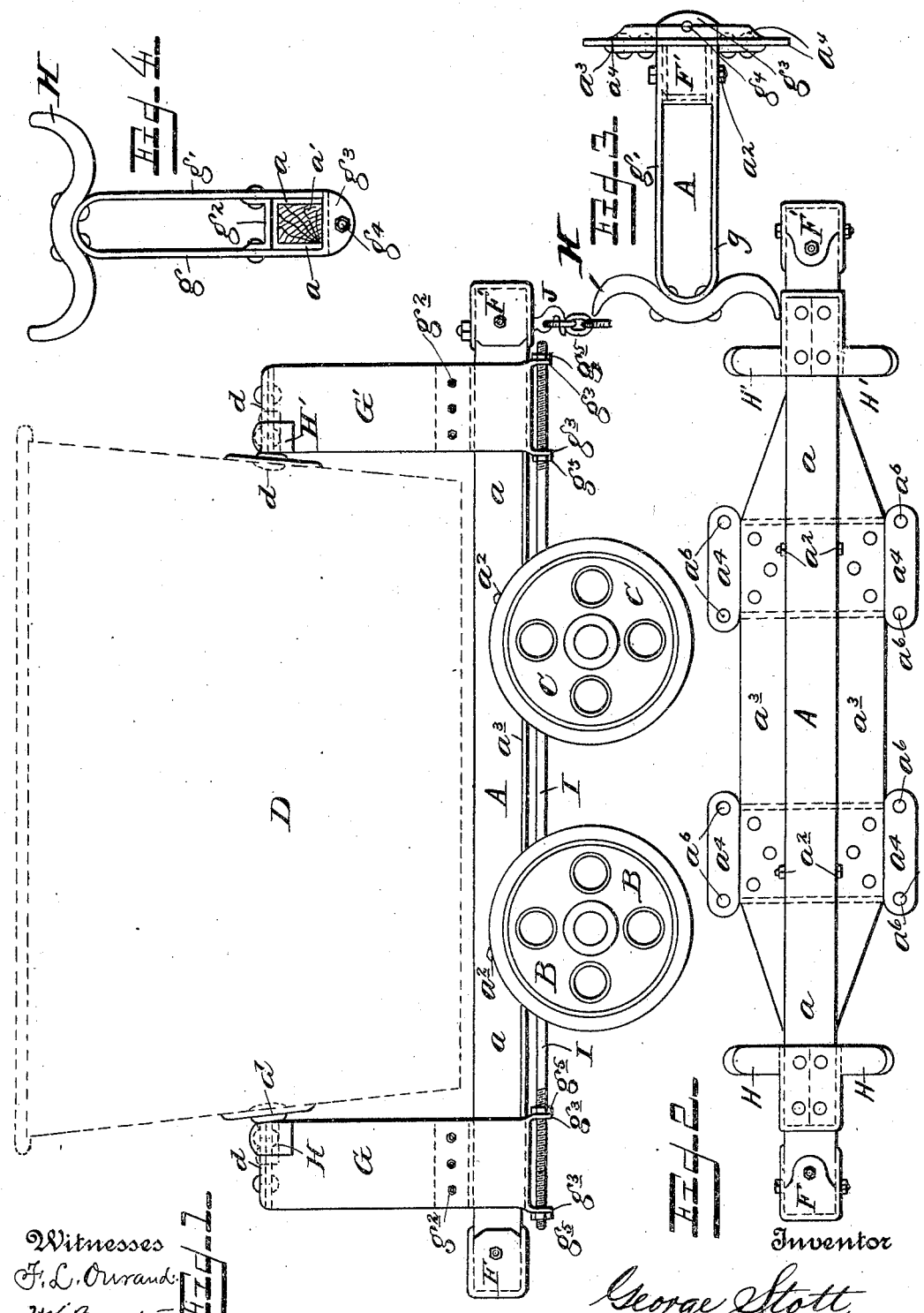

UNITED STATES PATENT OFFICE.

GEORGE STOTT, OF JOHANNESBURG, TRANSVAAL.

FRAME FOR MINE-TRUCKS OR SIMILAR VEHICLES.

SPECIFICATION forming part of Letters Patent No. 790,759, dated May 23, 1905.

Application filed November 2, 1903. Serial No. 179,613.

*To all whom it may concern:*

Be it known that I, GEORGE STOTT, a subject of the King of England, residing at Johannesburg, Transvaal, have invented certain new and useful Improvements in and Relating to the Frames of Mine-Trucks or Similar Vehicles, (for which I have made application for patent in the Transvaal, No. 370, filed August 24, 1903,) of which the following is a specification.

This invention relates to the frames of the trucks or small vehicles employed in mines, quarries, earthworks, &c., for the transport of mineral, coal, stone, earth, or the like.

It has for its objects to simplify and cheapen the construction and at the same time to provide a more durable frame than those at present in use.

With the present construction the wheels chafe the sides of the frame, which shortens the life of the truck by causing unnecessary friction, as well as a waste of power for the hauling or propulsion of the truck. My improved construction obviates this undue wear and tear, and hence effects a material saving in the power required to haul the truck.

By the present improvements I obtain greatly-increased strength and rigidity in the frame, as compared with the existing constructions, and breakages are rendered almost impossible.

Another object of my invention is to provide means for adjusting the standards which carry or support the pan, so that they may be adjusted to carry pans of different lengths.

I will now proceed to describe the invention in detail by aid of the accompanying sheet of drawings, forming part of this specification.

In the drawings, Figure 1 represents an elevation of the frame equipped with wheels for traversing the rails and showing the pan of the truck in dotted lines. Fig. 2 is a plan of the frame with the wheels, bearings, and pan removed. Fig. 3 is an end elevation of the frame, and Fig. 4 is an end elevation of one of the standards.

A designates the frame of the truck fitted with the ordinary wheels B C, adapted for traversing the rails or track, and D is the pan carried or supported in the frame by means of the two trunnions $d$, fixed at each end of the pan. The frame A, which is arranged at the center of the vehicle and longitudinally thereof, comprises the main portion or member $a$, which, as shown in Fig. 4, is of inverted channel or U section. In this portion $a$ is placed a beam $a'$ to strengthen the section and increase its rigidity. The beam $a'$ is secured inside the channel-section by means of the transverse bolts $a^2$. The part $a$ is constructed with a longitudinal projection or flange $a^3$ at each side, to which the plates $a^4$ are bolted, riveted, or otherwise secured to the frame. The plates $a^4$ carry the axle-boxes and wheels B C of the truck. As seen in Fig. 2, they may be provided with bolt-holes $a^6$ to serve for securing the bearings to the frame A. Over the extremities of the main part $a$ of the frame A are fitted caps F F', which, while acting as buffers, securely bind the parts together. The arrangement of the plates or brackets $a^4$ shown in the drawings effectively prevents the wheels B C from coming into contact with the sides of the frame A.

The standards G G' are constructed at their lower ends to fit and slide over the longitudinal main part $a$ of the frame A in the form of a sleeve and comprise two vertical pieces $g\ g'$ and a transverse piece $g^2$ of U-section riveted between them, which rests upon the top of the main portion $a$ of the frame. In the upper extremity of the standards G G' are riveted or otherwise securely fixed the horns H H', which serve as the pan carrier or bearer, and in which the trunnions $d$ on the sides of the pan rest.

It will be understood that the standards G G' are capable of moving longitudinally of the main portion $a$ of the frame A within certain limits in either direction. To provide for the adjustment of the standards G G' to carry pans of different lengths, the lower portions of the standards G G' are shaped at each end to form a downwardly-projecting lug $g^3$. A long parallel adjusting-bolt I is arranged below the main portion $a$ of the frame, the extremities of which bolt are screwed for a convenient length and project through a hole $g^4$, formed in the lugs $g^3$.

$g^5$ represents nuts for tightening on the bolt I beyond the lugs $g^3$ to secure the standards in position.

J is a coupling, which may be of any suitable construction.

What I claim as my invention, and desire to protect by Letters Patent, is—

1. In a truck or like vehicle of the character described, a frame comprising a single centrally-disposed member adapted to carry the standards or supports for the pan and the bearings for the wheels, said member being of channel-section, and a beam secured within the said member, as described for the purpose specified.

2. In a truck or like vehicle of the character described, the combination with a frame comprising a single centrally-disposed member, said member being adapted to carry the standards or supports for the pan and being of channel-section, a beam secured within the said member, horizontally-disposed flanges on said member and plates secured to said flanges and carrying the axle-boxes.

3. In combination the frame A comprising the single centrally-disposed member $a$, the standards or supports G G' arranged on the ends of the member $a$ and adapted to carry or support the pan D, and means for adjusting the standards G G' longitudinally of the frame A to adapt it to receive pans of different lengths, substantially as described.

4. In a truck or like vehicle of the nature specified the combination with the pan D of the frame comprising the single centrally-disposed member $a$ adapted to carry the standards for the pan and the bearings for the wheels, and the standards G G' slidably fitted on the ends of the part $a$ of the frame, and means located below the frame A engaging the supports G G' on the under side and acting when operated to traverse the standards G G' longitudinally of the part $a$ of the frame to adjust the standards to pans of different lengths, substantially as described.

5. In a truck or similar vehicle of the nature specified, in combination a single centrally-disposed frame comprising the longitudinal main portion $a$ of inverted channel or U section and the beam fitted therein, the standards or supports mounted thereon and capable of being moved longitudinally thereof and constructed to carry or support the pan, and the means for adjusting the standards comprising the adjusting-bolt projected through lugs formed on the under side of the standards and fitted with nuts for fixing the same to the standards, substantially as described and shown in the accompanying drawings.

6. In combination, the frame A comprising the single main centrally-disposed portion or member $a$ of inverted channel or U section, the beam $a'$ arranged in the member $a$, the bolts $a^2$ for fixing the beam $a'$ in the part $a$ of the frame, the longitudinal projection $a^3$ at each side of the part $a$ and the plates $a^4$ attached to the part $a^3$, the axle-boxes fixed to the plates $a^4$ and the wheels B C, the caps F F' forming buffers on the extremities of the part $a$ of the frame, the standards G G' slidably fitted on the part $a$ of the frame A comprising the vertical pieces $g$ $g'$ and the transverse piece $g^2$ fixed between them, the part $g^2$ resting upon the top of the part $a$ of the frame, the horns H H' secured to the upper ends of the pieces $g$ $g'$, which horns serve as the pan carrier or bearer, the downwardly-projecting lugs $g^3$ on the standards G G' beneath the part $a$ of the frame, the longitudinal parallel adjusting-bolt I below the part $a$ projected through the lugs $g^3$ and the nuts $g^5$ for tightening the bolt I between the lugs of the two standards to secure the latter in position after adjustment, substantially as described.

7. In a truck or like vehicle of the character described, the combination with a frame comprising a single centrally-disposed member of channel-section and standards constructed at their lower ends in the form of a sleeve which is slidingly mounted on the said member, said standards each comprising the lateral vertical pieces and a transverse piece arranged between and secured to the vertical pieces.

In witness whereof I have hereunto set my hand in the presence of two subscribing witnesses.

GEORGE STOTT.

Witnesses:
  CHAS. OVENDALE,
  R. OVENDALE.